US007586917B1

(12) United States Patent
Ferguson et al.

(10) Patent No.: US 7,586,917 B1
(45) Date of Patent: Sep. 8, 2009

(54) SYSTEMS AND METHODS FOR RE-ORDERING DATA IN DISTRIBUTED DATA FORWARDING

(75) Inventors: Dennis C. Ferguson, Palo Alto, CA (US); Hann-Hwan Ju, San Jose, CA (US); Atsushi Kasuya, Sunnyvale, CA (US); Gerald Cheung, Palo Alto, CA (US); Devereaux C. Chen, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 908 days.

(21) Appl. No.: 10/848,574

(22) Filed: May 19, 2004

Related U.S. Application Data (60) Provisional application No. 60/506,731, filed on Sep. 30, 2003.

(51) Int. Cl.
 *H04L 12/56* (2006.01)
(52) U.S. Cl. ................... 370/394; 370/389; 370/474
(58) Field of Classification Search ............... 370/389, 370/394, 474, 473, 536
See application file for complete search history.

(56) References Cited

U.S. PATENT DOCUMENTS

| | | | | |
|---|---|---|---|---|
| 6,747,972 | B1 * | 6/2004 | Lenoski et al. | 370/394 |
| 2002/0075873 | A1 * | 6/2002 | Lindhorst-Ko et al. | 370/394 |
| 2002/0122424 | A1 * | 9/2002 | Kawarai et al. | 370/394 |
| 2002/0150043 | A1 * | 10/2002 | Perlman et al. | 370/225 |
| 2003/0012199 | A1 * | 1/2003 | Ornes et al. | 370/394 |
| 2003/0081600 | A1 * | 5/2003 | Blaker et al. | 370/389 |
| 2003/0095536 | A1 * | 5/2003 | Hu et al. | 370/349 |
| 2003/0099232 | A1 * | 5/2003 | Kudou et al. | 370/389 |
| 2005/0025152 | A1 * | 2/2005 | Georgiou et al. | 370/394 |
| 2005/0089038 | A1 * | 4/2005 | Sugai et al. | 370/394 |

OTHER PUBLICATIONS

U.S. Appl. No. 10/417,196, filed Apr. 17, 2003; Spencer Greene; Systems and Methods for Processing Any-to-Any Transmissions; 35 pages.
U.S. Appl. No. 10/358,274, filed Feb. 5, 2003; Spencer Greene; Systems and Methods for Order Preserving Data; 37 pages.
U.S. Appl. No. 10/419,798, filed Apr. 22, 2003; Junying James Yu et al.; Systems and Methods for Distributed Data Forwarding; 28 pages.

* cited by examiner

*Primary Examiner*—Kwang B Yao
*Assistant Examiner*—Nguyen Ngo
(74) *Attorney, Agent, or Firm*—Harrity & Harrity, LLP (57) ABSTRACT

A network device includes an input interface, at least one processing path and an output interface. The input interface receives data units on a plurality of streams and assigns a first sequence number to each of the received data units. The at least one processing path performs a route look-up for each of the data units, where the route look-up determines a routing destination for a respective data unit. The output interface assigns a second sequence number to each of the processed data units based on a number of memory references associated with the route look-up for each of the data units and re-orders the processed data units based on the second sequence number assigned to each of the processed data units.

28 Claims, 9 Drawing Sheets

SYSTEMS AND METHODS FOR RE-ORDERING DATA IN DISTRIBUTED DATA FORWARDING

CROSS REFERENCE TO RELATED APPLICATION

The instant application claims priority from provisional application No. 60/506,731, filed Sep. 30, 2003, the disclosure of which is incorporated by reference herein in its entirety.

BACKGROUND OF THE INVENTION

1. Field of the Invention

The present invention relates generally to data processing devices, and more particularly, to systems and methods for re-ordering data processed by multiple processing paths in data processing devices.

2. Description of Related Art

In network devices that must deliver high throughput in forwarding a stream of data, an existing approach is to provide n independent paths and distribute sub-streams of the data down each of the n paths. After processing by each of the n processing paths, the sub-streams are recombined to create an output stream. A problem that arises using this technique is that the different processing paths may have different delays. As a result, if a first data unit (e.g., a packet or cell) is sent down a first path at time $t_1$ and a second data unit is sent down a second path at time $t_2 > t_1$, the second data unit may nonetheless finish being processed before the first. Therefore, if nothing is done to correct for this differential delay, the recombined stream of data will be out-of-order relative to the input stream. Out-of-order data units can be problematic in a number of networking applications.

There are well-known algorithms for restoring order to mis-ordered streams at recombination time, based on attaching sequence numbers to consecutive data units at input, and sorting data units to restore consecutive sequence numbers on output. However, in some applications, a given output will not receive all sequence numbers from a given input, making the standard sorting algorithms impractical. It is also desirable for system performance to be able to re-order data units belonging to different streams separately.

Therefore, there exists a need for systems and methods that can preserve the order of data units in data streams that have been distributed across multiple paths in a data processing device, such as a network device.

SUMMARY OF THE INVENTION

Systems and methods consistent with the principles of the invention address this and other needs by providing a re-ordering mechanism that re-orders, by stream, data units received out-of-order from multiple processing paths. The re-order mechanism, consistent with the principles of the invention, keeps track of one or more processing characteristics associated with the processing of each data unit that occurs within the multiple processing paths. The one or more tracked processing characteristics, thus, may be used as a stream identifier so that re-ordering of data units within each stream prevents a later data unit in a stream from being forwarded earlier than an earlier data unit in the same stream. Systems and methods consistent with the principles of the invention, therefore, may correct the out-of-order data units within streams that may result from using parallel processing paths.

One aspect consistent with the principles of the invention is directed to a method for re-ordering data units in multiple data streams transmitted across multiple processing paths. The method may include receiving data units associated with the multiple data streams and assigning a first sequence number to each of the received data units. The method may further include distributing the data units to the multiple processing paths and processing the data units at each of the multiple processing paths, with one or more processing characteristics being associated with the processing of each of the data units at each of the multiple processing paths. The method may also include re-assigning each of the processed data units with a corresponding second sequence number based on the one or more processing characteristics associated with each data unit, and re-ordering the processed data units based on the corresponding second sequence number associated with each of the data units.

A second aspect consistent with principles of the invention is directed to a method of re-ordering data units in multiple data streams. The method may include receiving data units and assigning a first sequence number to each of the received data units. The method may further include processing each of the data units, the processing including performing a route look-up for each of the data units. The method may also include assigning a corresponding second sequence number to each of the processed data units based on a number of memory references associated with the route look-up for each of the data units and re-ordering the processed data units based on the corresponding second sequence number assigned to each of the of the processed data units.

A third aspect consistent with principles of the invention is directed to a method of routing data units in multiple data streams. The method may include associating a corresponding first sequence number with each received data unit of multiple data units, where the first sequence number indicates a temporal relationship across all of the received data units of the multiple data units. The method may further include referencing routing data one or more times for each of the received data units to determine an appropriate routing path for each of the data units and assigning a corresponding second sequence number to each of the data units based on a number of routing data references associated with each respective data unit. The method may also include re-ordering each of the data units based on the assigned corresponding second sequence number and routing each of the data units via the appropriate routing path.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention re-order data units processed across multiple processing paths by keeping track of one or more processing characteristics associated with the processing of each data unit that occurs within the multiple processing paths. The one or more processing characteristics may include, in some implementations, a number of memory references that occur during a route lookup operation that determines a routing path for each respective data unit. The one or more processing characteristics may, thus, serve as a proxy for a stream identifier so data units may be re-ordered within each stream to prevent a later data unit in a stream from being forwarded earlier than an earlier data unit in the same stream.

Exemplary Network Device

Figure 1:
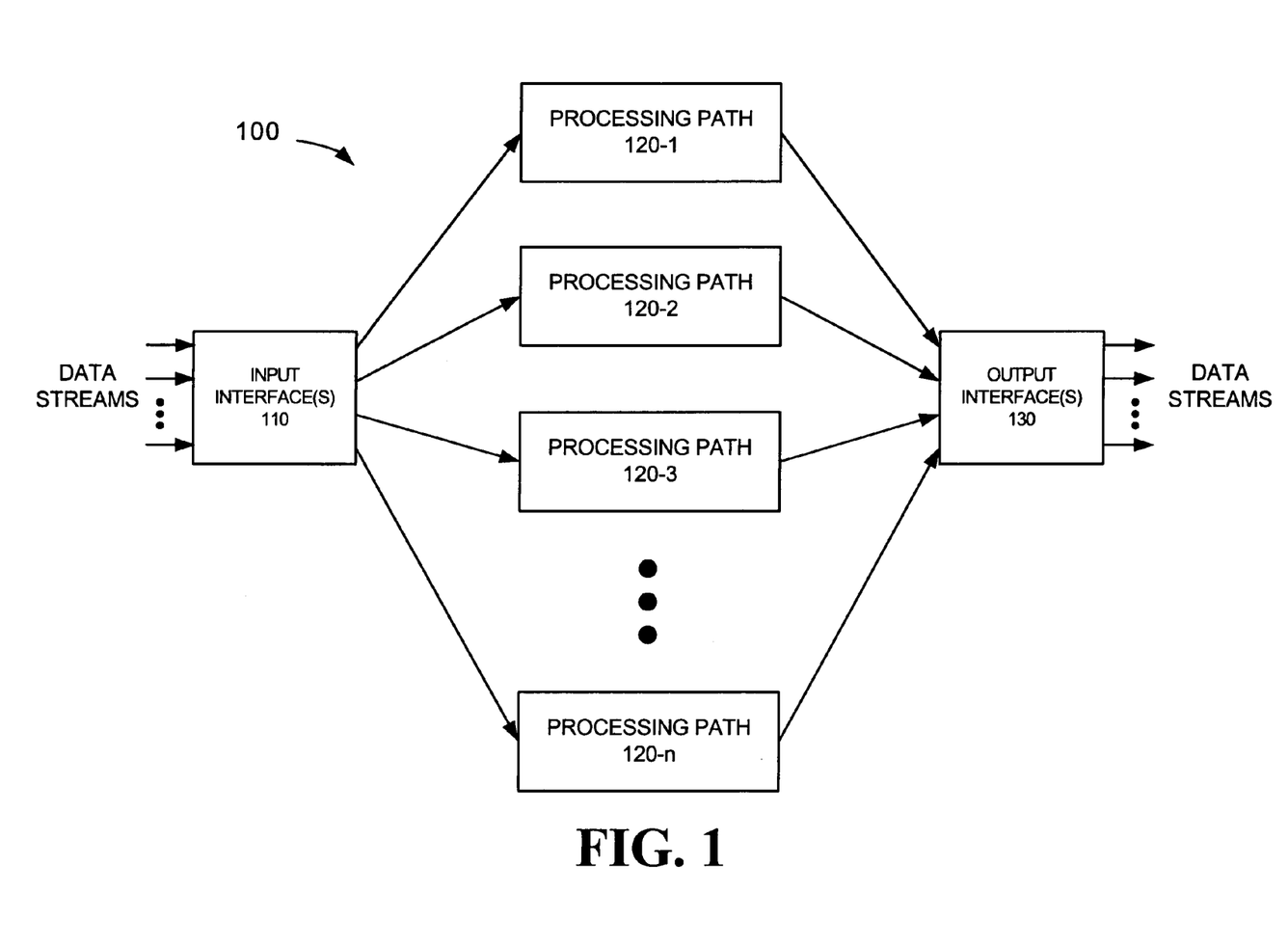
FIG. 1 is a diagram of an exemplary data processing device in which systems and methods consistent with the principles of the invention may be implemented.

FIG. 1 is a diagram of an exemplary data processing device 100 that may re-order data units sent across multiple processing paths. In one implementation, device 100 takes the form of a network device, such as a router. Device 100 may include one or more input interfaces 110, multiple processing paths 120-1 through 120-n (collectively referred to as processing paths 120), and one or more output interfaces 130. Each input interface 110 may include circuitry for receiving and processing a stream of data units. These data units may include, for example, packets, datagrams, cells, fragments or combinations of packets, datagrams, or cells, or other types of data. A data stream may include multiple data units received at input interface 110 that have an identical source and destination.

Processing paths 120 may include any number of devices that may independently process data units received from input interface 110. Such devices may be connected in series and/or parallel and may include multiple processing engines, such as, for example, route look-up engines. In this case, each processing path 120 may perform a route look-up process for each received data unit to determine an appropriate outgoing route for the data unit. Each route look-up process may include, for example, a number of references to memory (not shown), where the memory includes routing data accumulated through conventional routing protocols.

Consistent with the principles of the invention, any processing characteristic, or combination of processing characteristics, associated with each data unit, may be used for stream identification. For example, a number of references to memory for route look-up for each data unit may be used as a stream identifier. Streams may also be identified in other ways, such as, for example, by counting the number of times context is switched for a particular data unit. Therefore, data units with a different count can be considered as being associated with different streams. Data units with the same count may be associated with the same stream. A combination of multiple criteria may also be used for identifying a stream (e.g., a number of references to memory for route lookup and a number of times context is switched).

Figure 2:
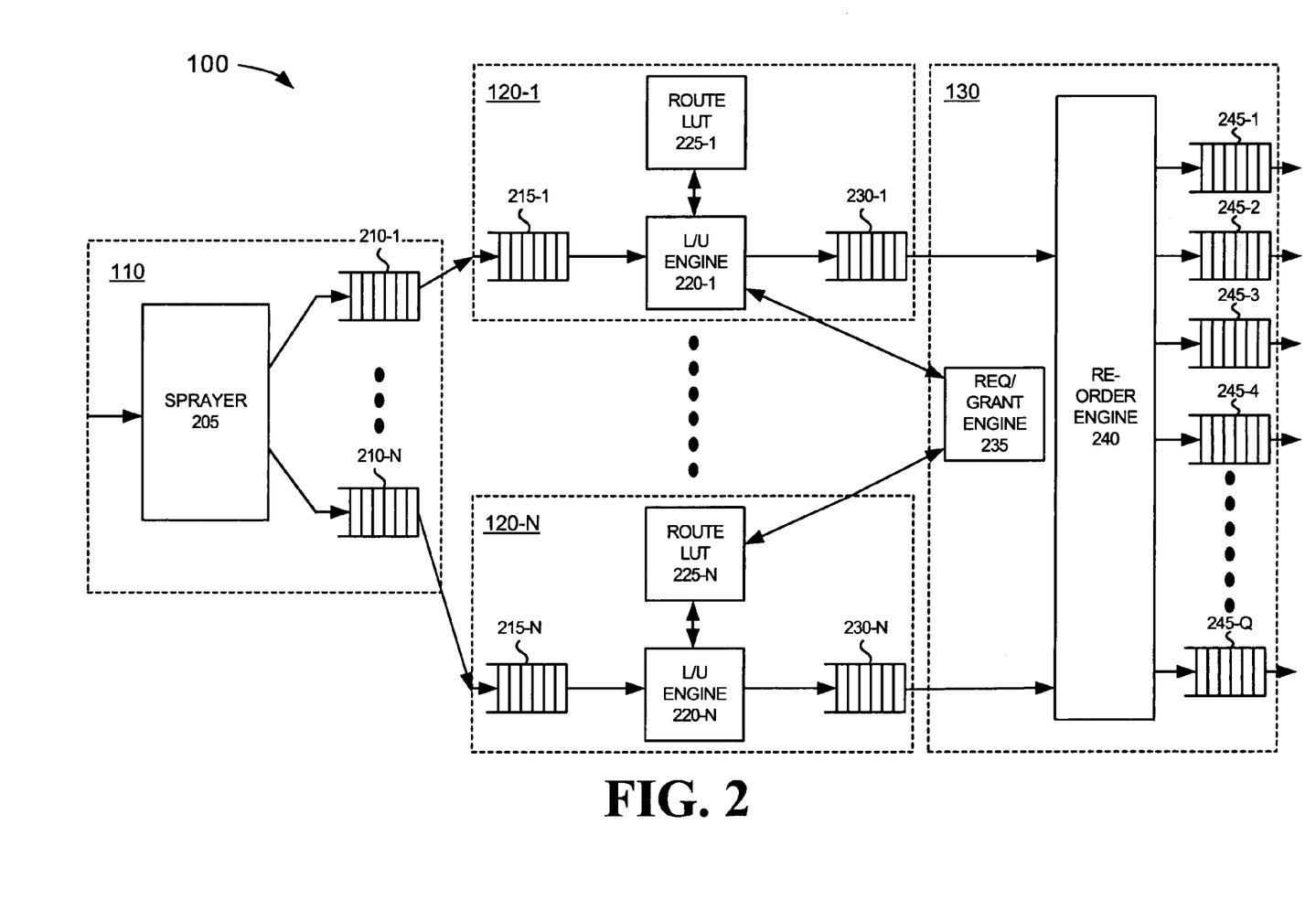
FIG. 2 is a diagram of exemplary components of the data processing device of FIG. 1 consistent with the principles of the invention.

FIG. 2 is a diagram further illustrating exemplary components of input interface 110, processing paths 120-1 through 120-N and output interface 130 of device 100. As shown, input interface(s) 110 may include a sprayer 205 and multiple queues 210-1 through 210-N. Each processing path 120-1 through 120-N may include an input queue 215, a route lookup (L/U) engine 220, a L/U table 225 and an output queue 230. Output interface(s) 130 may include a request/grant engine 235, a re-order engine 240 and multiple output queues 245-1 through 245-Q.

Sprayer 205 of input interface 110 may receive incoming data units, assign an incoming sequence number (incoming_seq_no) to each data unit, and "spray" each of the data units out towards one of the different processing paths 120-1 through 120-N. Each incoming sequence number may be assigned to indicate the temporal relationship across all incoming data units. Sprayer 205 may, in some implementations consistent with the principles of the invention, "spray" the data units to processing paths 120-1 through 120-N in accordance with a conventional load-balancing scheme that balances the load across each of the processing paths. In other implementations, sprayer 205 may "spray" the data units to processing paths 120-1 through 120-N in accordance with other known load regulating schemes. Prior to being passed to a processing path of processing paths 120-1 through 120-N, each data unit "sprayed" by sprayer 205 may be buffered in a corresponding queue 210-1 through 210-N.

An input queue 215 of a processing path 120 may receive a data unit "sprayed" by sprayer 205 and may buffer the data unit. Input queue 215 may pass each received data unit in, for example, a first-in-first-out (FIFO) fashion to route L/U engine 220. L/U engine 220 may extract a destination address from the data unit and perform a forwarding route lookup by using L/U table 225. To look up a forwarding route in L/U table 225, one or more memory references may have to be made. L/U engine 220 may maintain a count of one or more processing characteristics, such as, for example, a number of memory references (M) that has to be made to lookup the forwarding route in L/U table 225. After the route lookup, the outgoing queue identifier (Qid) and output interface identifier (Iid) may be known. L/U engine 220 may then send a request for a new output sequence number to whichever output interface 130 may ultimately transmit the data unit. The request may include the assigned incoming sequence number, the memory reference count (M), the outgoing queue identifier (Qid), a key hash, and the output interface identifier (Iid). The key hash may be used to determine which data units belong to the same stream. Data units with the same key hash may or may not belong to the same stream, but data units with a different key hash do not belong to the same stream. In response to the request, L/U engine 220 may receive a grant that may include a new output sequence number that may, ultimately, be used by the output interface to determine in what order, relative to other data units, to transmit the current data unit. L/U engine 220 may send the data unit, along with the output sequence number, the memory reference count (M), the outgoing queue identifier (Qid), the key hash, and the output interface identifier (Iid) to the output interface 130.

Request/grant engine 235 of output interface 130 may receive the sequence number request from L/U engine 220, and enqueue the request prior to retrieving an assigned output sequence number for the data unit. The output sequence number, in one implementation, may be retrieved from a memory location of multiple memory locations (called "buckets" herein) that corresponds to a hash on the data set {M, Qid, key hash, Iid}. Request/grant engine 235 may return the retrieved output sequence number to the L/U engine 220.

After receiving a data unit from a processing path 120, re-order engine 240 of output interface 130 may re-order the data unit, relative to other previously received data units, according to the data unit's assigned output sequence number. For example, a data unit with a memory reference count of 3 and an assigned output sequence number of 4 may be ordered before another data unit with a memory reference count of 3 and an assigned output sequence number of 5. Re-order engine 240 may place the re-ordered data unit in an appropriate output queue 245 that corresponds to the data unit's forwarding destination.

Exemplary Memory Reference Count Array

Figure 3:
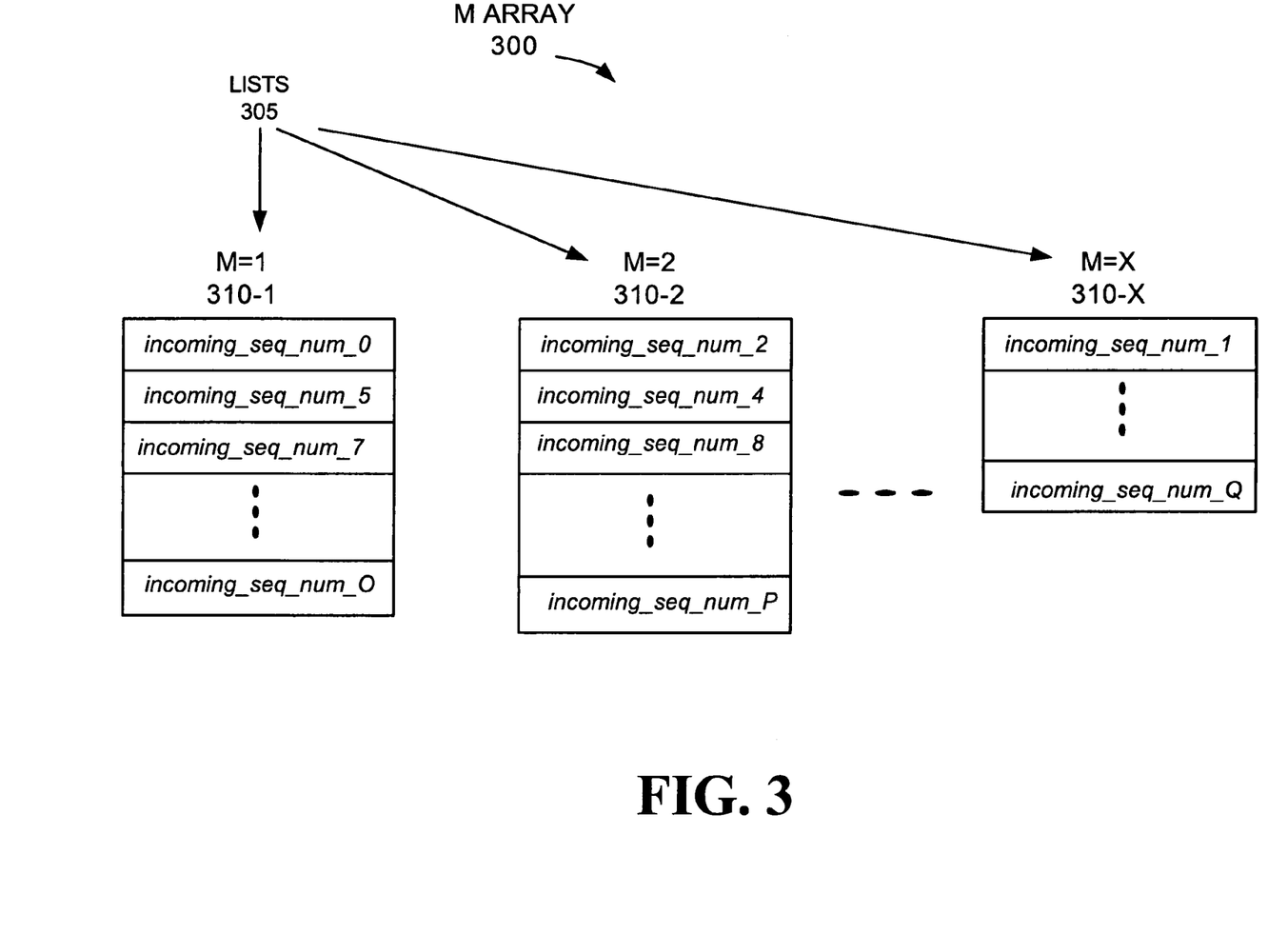
FIG. 3 is a diagram of an exemplary memory reference count array consistent with the principles of the invention.

FIG. 3 illustrates an exemplary memory reference count array (M array) 300 that may be associated with a request/grant engine 235 of output interface 130. M array 300 may include multiple variable length linked lists 305, with each being indexed by a memory reference count M. For example, a first list 310-1 may be indexed by a memory reference count of 1, a second list 310-2 may be indexed by a memory reference count of 2, and an Xth list 310-X may be referenced by a memory reference count of X. Each list of lists 310-1 through 310-X may include incoming sequence numbers assigned to data units whose route lookups have the same memory reference count.

Exemplary Buckets

Figure 4:
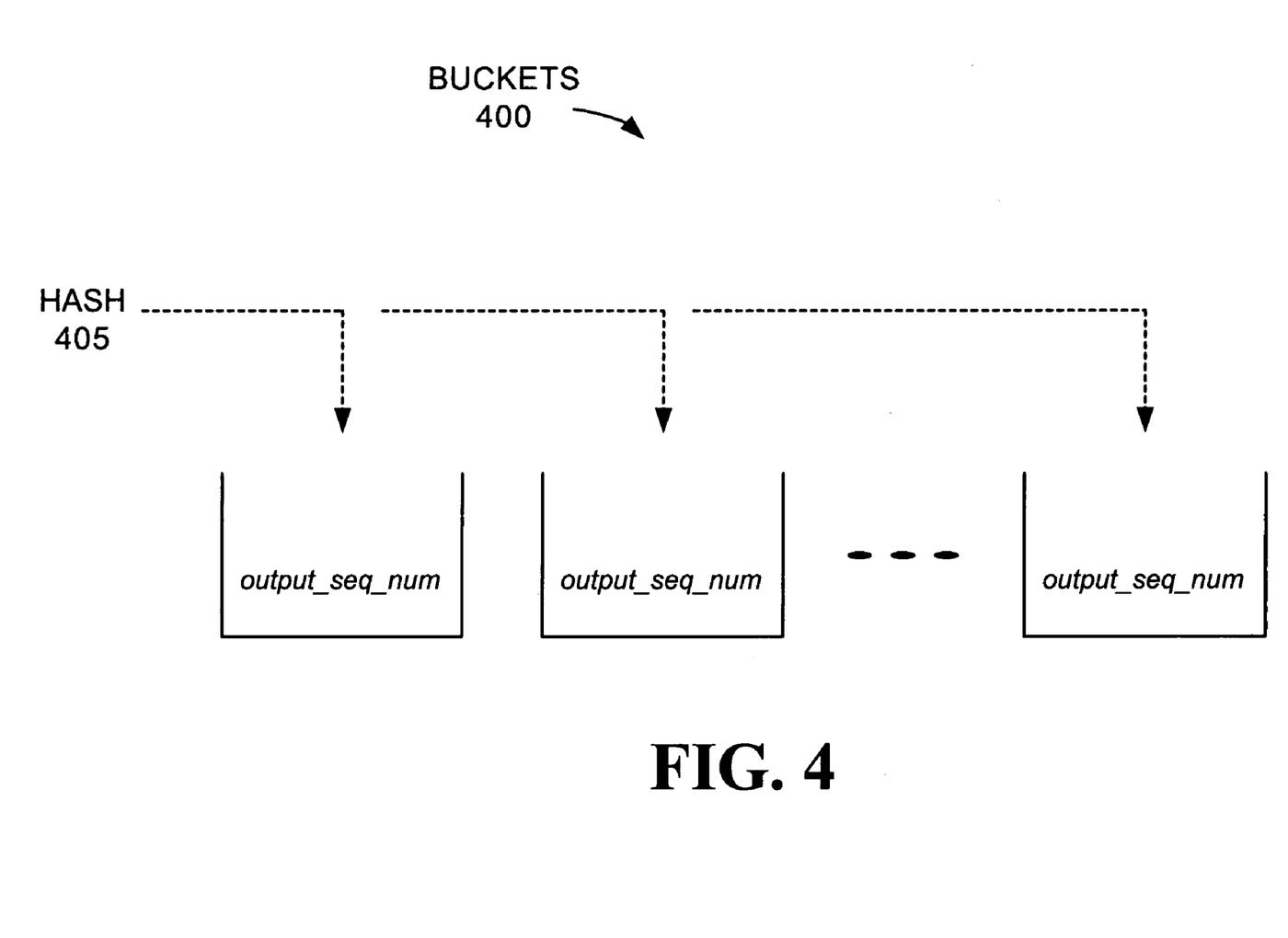
FIG. 4 is a diagram of memory location "buckets" that store valid output sequence numbers consistent with the principles of the invention.

FIG. 4 illustrates an exemplary array of memory locations, called "buckets" 400, for storing a next valid output sequence number for each stream of multiple streams of data units. A hash algorithm 405 may be performed on one or more stream identifiers to locate, and retrieve output sequence numbers from each of the respective buckets. The output sequence numbers (output_seq_num) corresponding to different buckets can run independently. Incoming data units that correspond to different buckets may, thus, be transmitted in any order.

Exemplary Data Unit Reception Process

Figure 5:
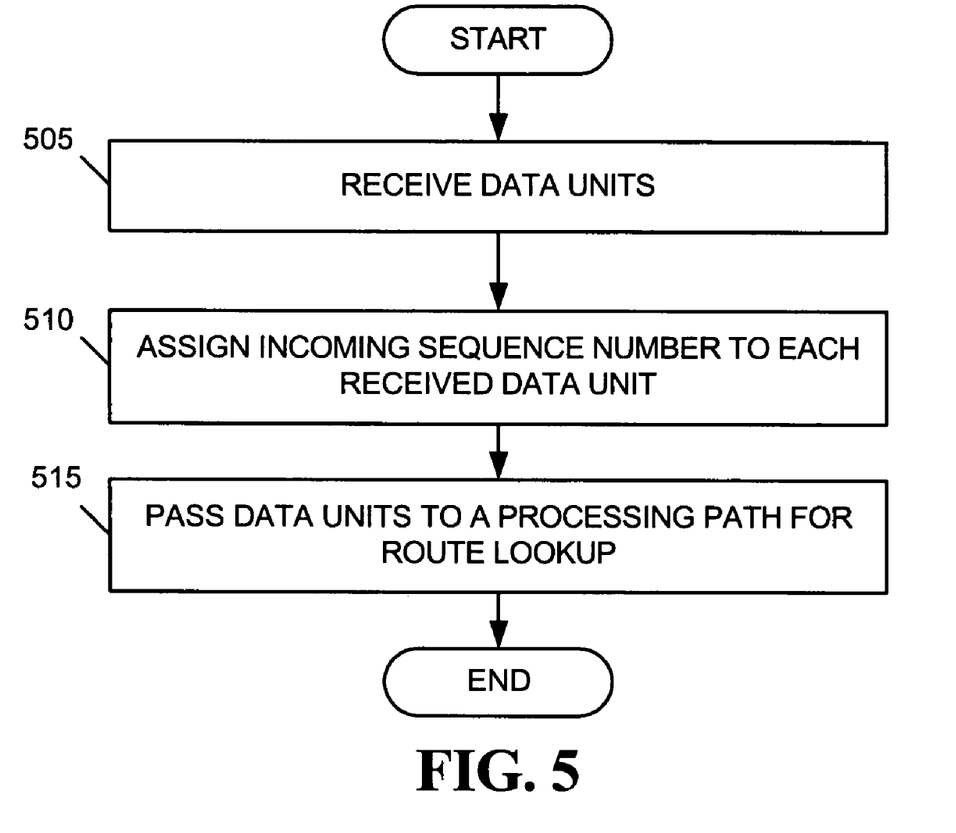
FIG. 5 is a flowchart of an exemplary process for receiving data units at an input interface according to an implementation consistent with the principles of the invention.

FIG. 5 is a flowchart of an exemplary process for processing data units received at an input interface 110 according to one implementation consistent with the principles of the invention. The exemplary process may begin with the receipt of data units at an input interface 110 (act 505). An incoming sequence number (incoming_seq_no) may be assigned to each of the received data units (act 510). The sequence numbers may be assigned to correspond to the temporal relationship across all incoming packets received at the input interface 110. Each of the data units may be passed to one of the processing paths 120-1 through 120-N for route lookup (act 515). For example, the data unit may be "sprayed" to one of the processing paths according to a conventional load-balancing scheme using sprayer 205.

Exemplary Lookup Engine Processing

Figure 6:
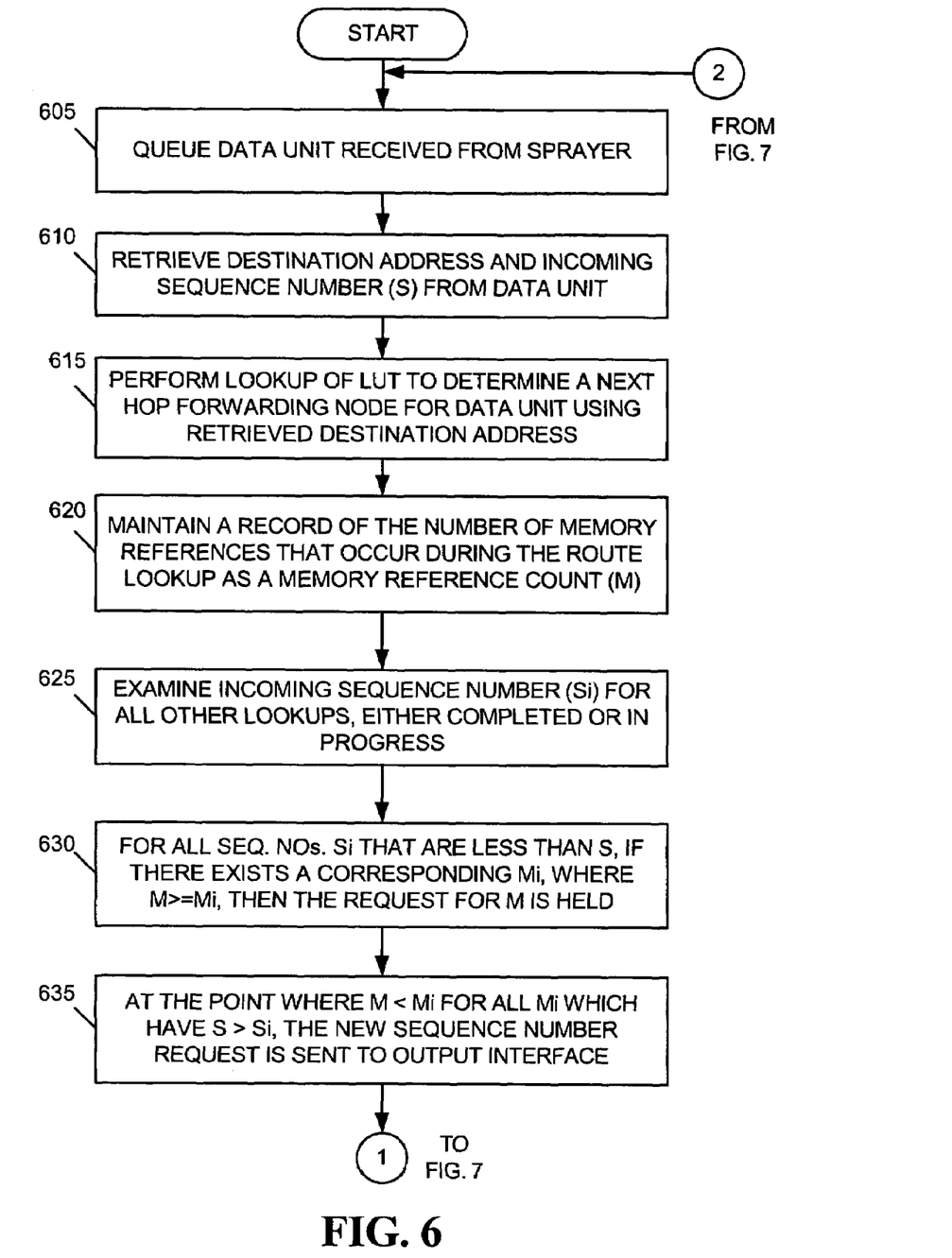
FIGS. 6-7 are flowcharts of exemplary lookup engine data unit processing according to an implementation consistent with principles of the invention.
Figure 7:
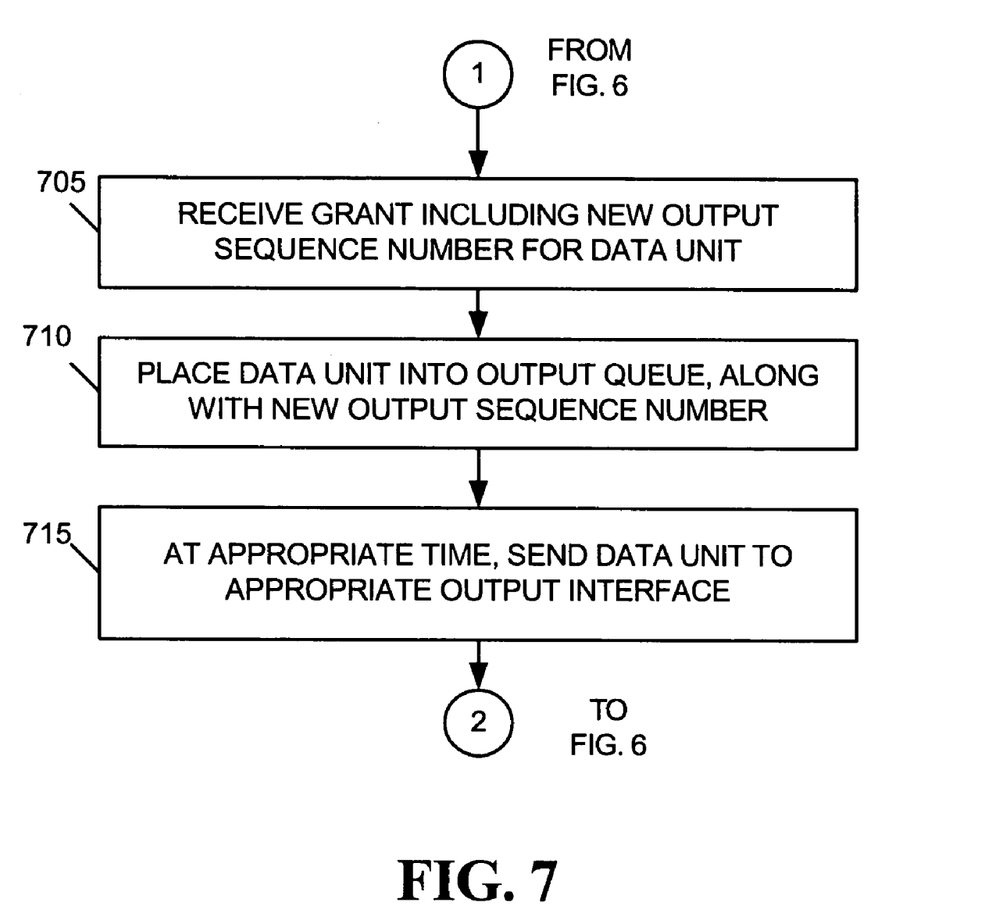

FIGS. 6-7 are flowcharts of an exemplary process for processing data units "sprayed" from input interface 110 and received at a processing path 120 according to an implementation consistent with principles of the invention. The exemplary process may begin with the queueing, at input queue 215, of a data unit "sprayed" from input interface 110 (act 605). L/U engine 220 may retrieve the queued data unit from input queue 215 and retrieve the data unit's destination address and incoming sequence number (S) (act 610). L/U engine 220 may perform a lookup of route LUT 225 to determine a next hop forwarding node for the data unit using the retrieved destination address (act 615). L/U engine 220 may maintain a record of the number of memory references that occur during the route lookup as a memory reference count (M) (act 620). L/U engine 220 may then examine the incoming sequence numbers (Si) for all other lookups that are either completed or are in progress (act 625). L/U engine 220 may then hold the sequence number request, if for all sequence numbers Si that are less than S, there exists a corresponding memory reference count Mi, where M>=Mi (act 630). At the point where M<Mi, for all Mi which have S>Si, the sequence number request for the current data unit may be sent to the request/grant engine 235 of the output interface 130 that will transmit the data unit (act 635).

LIU engine 220 may receive a grant from request/grant engine 235, that corresponds to the sequence number request sent to the output interface 130. The received grant may include a new output sequence number assigned for the data unit by the request/grant engine 235 (act 705). L/U engine 220 may place the data unit into output queue 230, along with the assigned output sequence number (act 710). At an appropriate time, the enqueued data unit may be sent to the appropriate output interface 130 (act 715).

Exemplary Output Interface Processing

Figure 8:
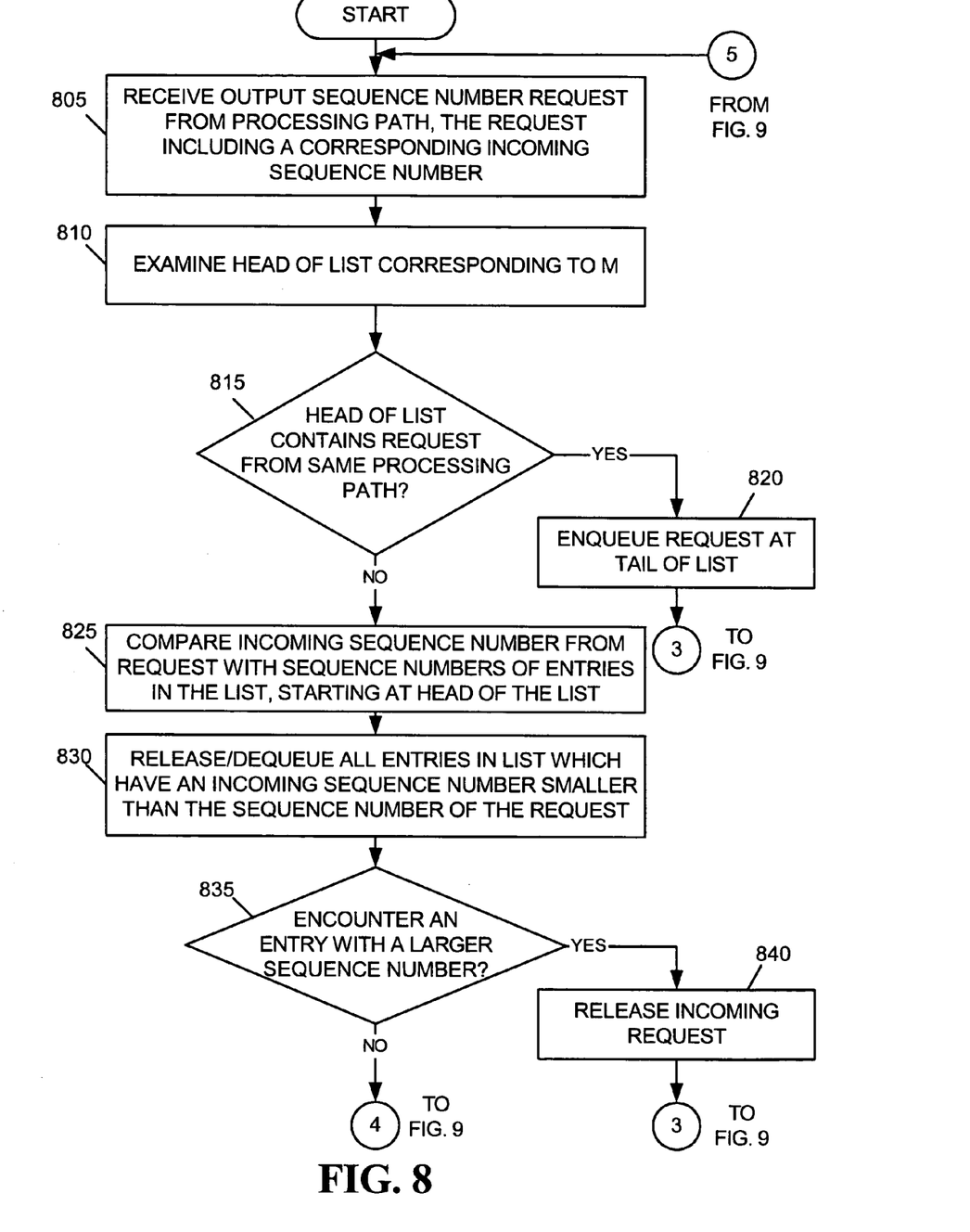
FIGS. 8-9 are flowcharts of exemplary output interface processing according to an implementation consistent with principles of the invention.
Figure 9:
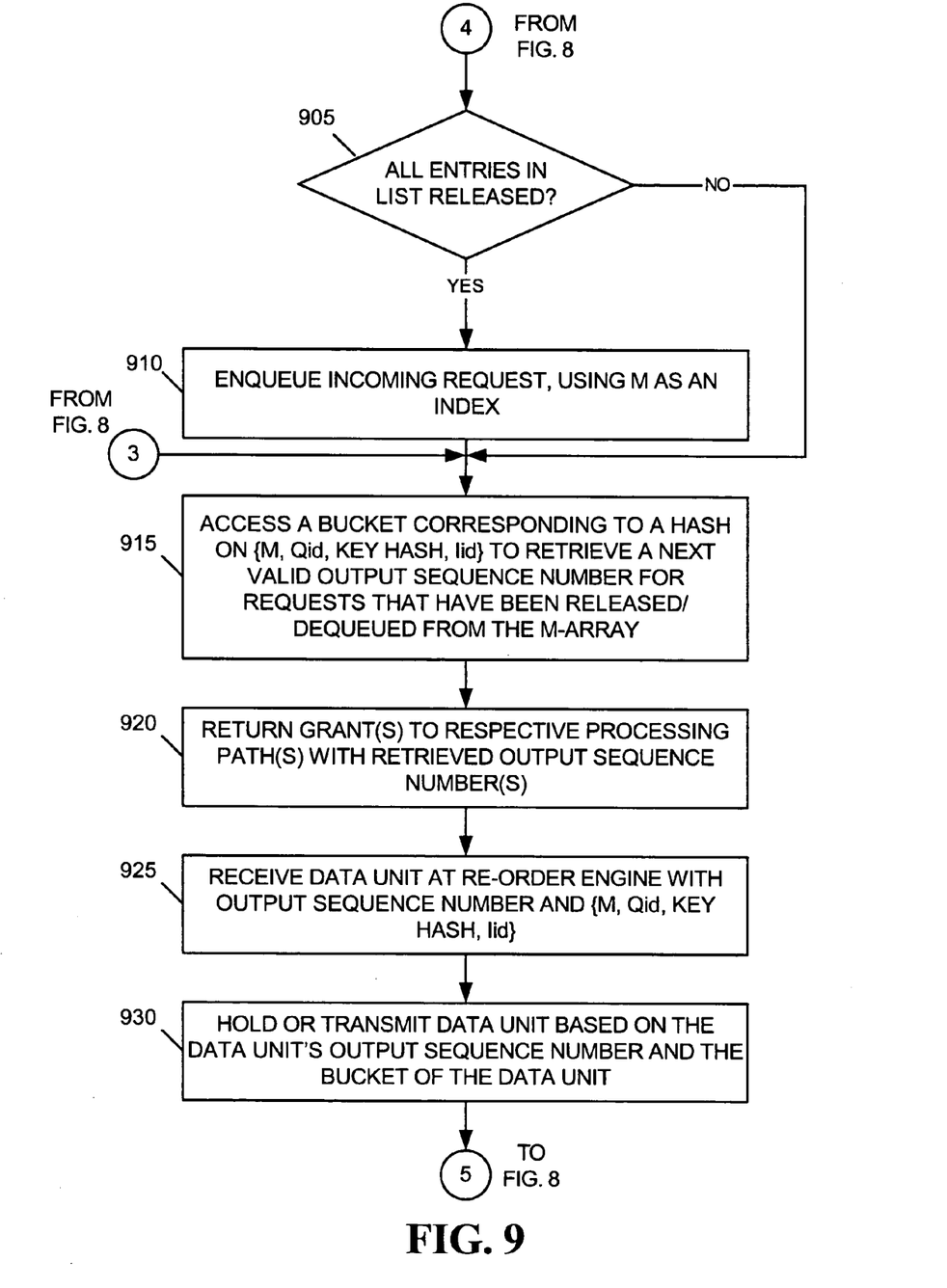

FIGS. 8 and 9 are flowcharts of an exemplary process for processing new sequence number requests, associated with respective data units, received at a request/grant engine 235 from a L/U engine 220, and re-ordering the data units at re-order engine 240, according to an implementation consistent with the principles of the invention.

The exemplary process may begin with the receipt of an output sequence number request from a L/U engine 220 of a processing path 120 at a request/grant engine 235 (act 805). The request may include an incoming sequence number assigned at an input interface 110 that received the corresponding data unit and a memory reference count (M), an outgoing queue identifier (Qid), a key hash, and an output interface identifier (Iid). Request/grant engine 235 may examine the head of the linked list 310 corresponding to the memory reference count M (act 810). A determination may be made whether the head of the list 310 contains a request from the same processing path (act 815). Whether the head of the list 310 contains a request from the same processing path may be determined based on which physical interface the received request arrived from. If the head of the list 310 does contain a request from the same processing path, the received request may be enqueued at the tail of the list 310 (act 820). If the head of the list 310 does not contain a request from the same processing path, then request/grant engine 235 may compare the incoming sequence number from the request with sequence numbers of entries in the list 310, starting at the head of the list 310 (act 825). Request/grant engine 235 may release/dequeue all entries in the list 310 that have an incoming sequence number smaller than the sequence number of the received request (act 830).

Request/grant engine 235 may then determine whether an entry with a larger sequence number is encountered in the list 310 (act 825). If so, then the received request may be released, and the exemplary process may continue at act 915 (FIG. 9). If an entry larger then the sequence number is not encountered, then request/grant engine may determine whether all entries in the list have been released (act 905). If not, the exemplary process may continue at act 915 below. If all entries in the list have been released, then request/grant engine 235 may enqueue the incoming request in a list 310, using the associated memory reference count M as an index into the M array 300 (act 910).

Request/grant engine 235 may access a bucket corresponding to a hash on the memory reference count (M), the outgoing queue identifier (Qid), a key hash, and an output interface identifier (Iid) (i.e., the data set {M, Qid, key hash, Iid}) to retrieve a next valid output sequence number for requests that have been released/dequeued from the M-array 300 (act 915). Request/grant engine 235 may return a grant(s) to respective processing paths with the retrieved output sequence number (act 920). Data units may be received from a respective processing path 120 at re-order engine 240 with an assigned output sequence number and an associated memory reference count (M), outgoing queue identifier (Qid), key hash, and output interface identifier (Iid) (act 925). Re-order engine 240 may hold, or transmit, the data units based on each respective data unit's assigned output sequence number and the bucket corresponding to the data unit (act 930).

CONCLUSION

Consistent with the principles of the present invention, a re-ordering mechanism re-orders, by stream, data units received out-of-order from multiple processing paths. The re-order mechanism keeps track, for example, of a number of memory references that occur when a route look-up is performed for routing each received data unit. The number of memory references may be used as a proxy for a stream identifier so that re-ordering of data units within each stream prevents a sequentially later data unit in a stream from being forwarded earlier than a sequentially earlier data unit in the same stream.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, in some implementations consistent with the principles of the invention, when a new sequence number request, with a memory reference count of M and incoming sequence number of S is processed by a processing path 120, the processing path 120 may issue a "virtual" request to the request/grant engine 235 of the output interface 130. In response to the "virtual request," request/grant engine 235 may "prune" all outstanding sequence number requests that have memory references=M and incoming sequence number<S. While series of acts have been described with respect to FIGS. 5-9, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for re-ordering data units in a plurality of data streams transmitted across a plurality of processing paths, comprising:

receiving data units associated with the plurality of data streams;
assigning a first sequence number to each of the received data units;
distributing the data units to the plurality of processing paths;
processing the data units at each of the plurality of processing paths, one or more processing characteristics being associated with the processing of each of the data units at each of the plurality of processing paths;
for each data unit:
 indexing, using the one or more processing characteristics, the first sequence number of the data unit into a list of a plurality of lists, where each one of the plurality of lists corresponds to a particular value of the one or more processing characteristics; and
 dequeuing all entries in the list that have sequence numbers smaller than the first sequence number;
 re-assigning data units corresponding to each of the dequeued entries with a corresponding second sequence number based on the list; and
re-ordering the processed data units based on the corresponding second sequence number associated with each of the data units.

2. The method of claim 1, where the indexing comprises:
comparing the first sequence number with entries in the list to determine whether the first sequence number is larger than entries in the list; and
storing the first sequence number in the list based on the comparison.

3. The method of claim 1, where re-assigning data units corresponding to each of the dequeued entries comprises:
comparing the first sequence number with entries in the list to determine whether the first sequence number is larger than the entries in the list; and
re-assigning data units corresponding to each of the dequeued entries with the corresponding second sequence number based on the comparison.

4. The method of claim 1, where re-assigning each of the processed data units with a corresponding sequence number comprises:
performing a hash algorithm on a data stream identifier to produce hash values for each of the processed data units; and
using the hash values to retrieve an available corresponding second sequence number for each of the processed data units.

5. The method of claim 1, further comprising:
determining an outgoing route for each of the data units by referencing routing data stored in memory.

6. The method of claim 5, where the one or more processing characteristics comprise a number of routing data memory references performed for each data unit.

7. The method of claim 1, where the one or more processing characteristics comprise a number of context switches performed for each data unit.

8. The method of claim 1, where each of the plurality of processing paths processes the distributed data units with a different processing time.

9. The method of claim 1, where the data units associated with the plurality of streams are received in sequential order.

10. The method of claim 9, where the processed data units are out of the sequential order.

11. Elements, comprising:
at least one interface configured to:
 receive data units associated with a plurality of data streams, assign a first sequence number to each of the received data units, and distribute the data units to a plurality of processing paths;

the plurality of processing paths configured to:

process the distributed data units, one or more processing characteristics being associated with the processing of each of the data units; and at least one interface further configured to:

index, using the one or more processing characteristics, the first sequence number into a list of a plurality of lists, where each one of the plurality of lists corresponds to a particular value of the one or more processing characteristics;

compare the first sequence number with entries in the list to determine whether the first sequence number is larger than entries in the list;

re-assign each of the processed data units with a corresponding second sequence number based on the comparison; and re-order the processed data units based on the corresponding second sequence number associated with each of the data units.

12. The elements of claim 11, where the at least one interface is further configured to:

compare the first sequence number with entries in the list to determine whether the first sequence number is larger than entries in the list; and store the first sequence number in the list based on the comparison.

13. The elements of claim 11, where the at least one interface is further configured to:

dequeue all entries in the list of sequence numbers that have sequence numbers smaller than the first sequence number; and re-assign data units corresponding to each of the dequeued entries with a corresponding second sequence number based on the list.

14. The elements of claim 11, where the at least one interface is further configured to:

performing a hash algorithm on a data stream identifier to produce hash values for each of the processed data units; and using the hash values to retrieve an available corresponding second sequence number for each of the processed data units.

15. The elements of claim 11, where the plurality of processing paths are configured to:

determine an outgoing route for each of the data units by referencing routing data stored in memory.

16. The elements of claim 15, where the one or more processing characteristics comprise a number of routing data memory references performed for each data unit.

17. The elements of claim 15, where the one or more processing characteristics comprise a number of context switches performed for each data unit.

18. The elements of claim 11, where each of the plurality of processing paths processes the distributed data units with a different processing time.

19. The elements of claim 11, where the data units on the plurality of streams are received in sequential order.

20. The elements of claim 11, where the processed data units are in an order different from the sequential order.

21. A method of re-ordering data units in a plurality of data streams, comprising:

receiving a data unit;

assigning a first sequence number to the received data unit;

processing the received data unit, the processing including performing a route look-up for the received data unit;

indexing the first sequence number, based on a number of memory references associated with a route look-up for the received data unit, into one list of a plurality of lists of sequence numbers;

dequeuing all entries in the list that have sequence numbers smaller than the first sequence number;

assigning a corresponding second sequence number to data units corresponding to the dequeued entries based on, for a particular data unit, a number of memory references associated with a route look up for the particular data unit; and re-ordering the data units corresponding to the dequeued entries based on, for a particular data unit, the corresponding second sequence number assigned to the particular data unit.

22. The method of claim 21, where the route look-up determines a routing destination for a respective data unit.

23. The method of claim 21, where the indexing comprises:

comparing the first sequence number with entries in the list of sequence numbers to determine whether the first sequence number is larger than entries in the list of sequence numbers; and storing the first sequence number in the list based on the comparison.

24. The method of claim 21, where assigning a corresponding second sequence number comprises:

performing a hash algorithm on a number of memory references associated with a route look-up for a particular data unit to produce a hash value for the particular data unit; and using the hash value to retrieve the corresponding second sequence number for the particular data unit.

25. A network device, comprising:

at least one input interface configured to:

receive data units comprising a plurality of streams, and assign a first sequence number to each of the received data units;

at least one processing path configured to perform a route look-up for each of the data units, wherein the route look-up determines a routing destination for a respective data unit; and at least one output interface configured to:

index the first sequence number into a list of a plurality of lists, based on a number of memory references that occurred during the route look-up for each of the data units, compare the first sequence number with entries in the list to determine whether the first sequence number is larger than entries in the list, store the first sequence number in the list based on the comparison, and re-order the processed data units based on the particular list to which the first sequence number associated with a particular one of each of the processed data units was indexed.

26. A method of routing data units in a plurality of data streams, comprising:

associating a first sequence number with each received data unit of a plurality of data units, wherein the first sequence number indicates a temporal relationship across all of the received data units of the plurality of data units;

referencing routing data one or more times for each of the received data units to determine an appropriate routing path for each of the data units;

indexing the first sequence number, based on the number of memory references associated with the route look-up for each of the data units, into a list of a plurality of lists of sequence numbers;

compare the first sequence number with entries in the list to determine whether the first sequence number is larger than entries in the list;

store the first sequence number in the list based on the comparison;

dequeue entries in the list that have values smaller than the first sequence number;

perform a hash algorithm on the number of memory references associated with the route look-up for data units associated with the dequeued entries;

assign corresponding second sequence numbers to the data units associated with the dequeued entries based on the hash algorithm;

re-ordering the data units associated with the dequeued entries based on the assigned corresponding second sequence numbers; and routing the data units associated with the dequeued entries via the appropriate routing path.

27. A data processing device, comprising:

a memory storing routing data;

at least one input interface configured to:

receive data units on a plurality of data streams, and associate a corresponding first sequence number with each received data unit of a plurality of data units, wherein the first sequence number indicates a temporal relationship across all of the received data units of the plurality of data units;

at least one processing path configured to reference the routing data one or more times for each of the data units to determine an appropriate routing path for each of the data units; and at least one output interface configured to:

index the first sequence number into a list of a plurality of lists, based on a number of routing data references performed with each respective data unit;

dequeue entries in the list that have sequence numbers smaller than the first sequence number;

perform a hash algorithm on data units corresponding to the dequeued entries, where the hash algorithm determines which data units belong to the same data stream;

assign a corresponding second sequence number for the data units based on the hash algorithm;

re-order the data units based on the assigned second sequence numbers; and route the data units via the appropriate routing path.

28. A system for re-ordering data units in a plurality of data streams transmitted across a plurality of processing paths, comprising:

means for receiving data units associated with the plurality of data streams;

means for assigning a first sequence number to each of the received data units;

means for distributing the data units to the plurality of processing paths;

means for processing the data units at each of the plurality of processing paths, one or more processing characteristics being associated with the processing of each of the data units at each of the plurality of processing paths;

means for performing a hash algorithm on a data stream identifier to produce hash values for each of the processed data units;

means for using the hash values to retrieve an available corresponding second sequence number for each of the processed data units;

means for re-assigning each of the processed data units with the available corresponding second sequence number; and means for re-ordering the processed data units based on the available corresponding second sequence number associated with each of the data units.

* * * * *